United States Patent
Igarashi et al.

(10) Patent No.: US 11,236,840 B2
(45) Date of Patent: Feb. 1, 2022

(54) FLOW RATE REGULATING DEVICE AND CONTROL METHOD OF FLOW RATE REGULATING DEVICE

(71) Applicant: Surpass Industry Co., Ltd., Saitama (JP)

(72) Inventors: Hiroki Igarashi, Saitama (JP); Yukinobu Imai, Saitama (JP); Daisuke Kanazawa, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 0 days.

(21) Appl. No.: 16/555,347

(22) Filed: Aug. 29, 2019

(65) Prior Publication Data

US 2020/0072375 A1 Mar. 5, 2020

(30) Foreign Application Priority Data

Aug. 31, 2018 (JP) .............................. JP2018-162759

(51) Int. Cl.
*F16K 31/04* (2006.01)
*F16K 7/12* (2006.01)

(52) U.S. Cl.
CPC .............. *F16K 31/046* (2013.01); *F16K 7/12* (2013.01)

(58) Field of Classification Search
CPC ........................... F16K 31/046; G05D 7/0635
See application file for complete search history.

(56) References Cited

U.S. PATENT DOCUMENTS 3,612,090 A * 10/1971 Kassel ................. G05D 7/0635
                                                                137/209
5,085,248 A * 2/1992 Iwata ..................... F02M 3/075
                                                                137/625.48
2009/0072173 A1 3/2009 Hasunuma et al.
(Continued)

FOREIGN PATENT DOCUMENTS

JP         H04111966 U    9/1992
JP         H08159321 A    6/1996
(Continued)

OTHER PUBLICATIONS

Japanese Office Action, OAP06140, 2018-162759.

*Primary Examiner* — Reinaldo Sanchez-Medina
*Assistant Examiner* — Nicole Gardner
(74) *Attorney, Agent, or Firm* — Flener IP & Business Law; Zareefa B. Flener (57) ABSTRACT

There is provided a flow rate regulating device including a valve body section having a flat valve body surface, a valve seat section having a flat valve seat surface, a regulation mechanism that moves the valve body section along an axis, and a control unit that controls the regulation mechanism, wherein the regulation mechanism has a stepping motor that rotates a drive shaft about the axis, and a moving member that moves along the axis in response to the rotation of the drive shaft and is coupled to the valve body section, and the control unit controls the stepping motor so that the valve body section moves in a movement range in which the valve body surface and the valve seat surface maintain a non-contact state, in accordance with an excitation signal that changes by a micro step unit obtained by dividing a step by a predetermined division number.

10 Claims, 8 Drawing Sheets

(56) References Cited

U.S. PATENT DOCUMENTS

| | | | |
|---|---|---|---|
| 2010/0036534 A1* | 2/2010 | Ding | G05D 7/0635 |
| | | | 700/282 |
| 2012/0187202 A1 | 7/2012 | Yuuya et al. | |
| 2019/0316703 A1* | 10/2019 | Dohi | F16K 31/53 |

FOREIGN PATENT DOCUMENTS

| JP | H11051514 A | 2/1999 |
|---|---|---|
| JP | 2006112504 A | 4/2006 |
| JP | 2012154371 A | 8/2012 |
| JP | 5144880 B | 2/2013 |
| JP | 2006153262 B | 2/2013 |
| JP | 2017180525 A | 10/2017 |

\* cited by examiner

FLOW RATE REGULATING DEVICE AND CONTROL METHOD OF FLOW RATE REGULATING DEVICE

CROSS-REFERENCE TO RELATED APPLICATIONS

This application is based on Japanese Patent Application No. 2018-162759, the contents of which are incorporated herein by reference in its entirety.

TECHNICAL FIELD

The present disclosure relates to a flow rate regulating device and a control method of the flow rate regulating device.

BACKGROUND ART

There has heretofore been known a flow rate regulating valve that controls a flow rate of a fluid (e.g., see PTL 1). The flow rate regulating valve disclosed in PTL 1 transmits a drive force of a motor to a diaphragm needle as a valve body, and regulates a gap between a fluid inlet and the diaphragm needle inserted into the fluid inlet, to regulate the flow rate of the fluid.

CITATION LIST

Patent Literature

[PTL 1] the Publication of Japanese Patent No. 5144880

SUMMARY

Technical Problem

When assembling a flow rate regulating device disclosed in PTL 1, it is necessary to install a drive unit and a diaphragm needle attached to the drive unit in a housing. In this case, when a central axis of a fluid inlet opened in a valve seat and a central axis of the diaphragm needle are accurately matched, the diaphragm needle does not come in contact with the fluid inlet during upward and downward movement of the diaphragm needle.

However, when a positioning accuracy during the installation of the drive unit and the diaphragm needle in the housing and dimensional accuracy of each component are not sufficient, the central axis of the fluid inlet and the central axis of the diaphragm needle are not matched. In this case, when the diaphragm needle moves upward and downward, the diaphragm needle comes in contact with the fluid inlet, and a part of a material of the diaphragm needle and the fluid inlet might be discharged as particles (e.g., fine particles having a particle diameter of 20 nm or less). The particles are mixed as impurities in a fluid, and hence, purity of the fluid cannot be kept to be high. In particular, when a chemical solution for a semiconductor manufacturing apparatus or a high-purity liquid such as pure water is handled as the fluid, problems of the particles become noticeable.

The present disclosure has been developed to solve the above problems, and an object thereof is to provide a flow rate regulating device and a control method of the device that can inhibit generation of particles when assembly errors or dimensional errors of members constituting a valve body section and members constituting a valve seat section are generated, and can accurately regulate a flow rate of a fluid.

Solution to Problem

The present disclosure employs the following solutions to achieve the above object.

A flow rate regulating device according to one aspect of the present disclosure includes a valve body section that moves along an axis extending in a vertical direction in a valve chamber and has a flat valve body surface extending in a horizontal direction; a valve seat section having a flat valve seat surface provided around a channel opening that communicates with an inner channel and the valve chamber, disposed at a position opposite to the valve body surface and extending in the horizontal direction; a regulation mechanism that moves the valve body section along the axis to regulate a distance between the valve body surface and the valve seat surface; and a control unit that controls the regulation mechanism, wherein the regulation mechanism has a stepping motor that rotates a drive shaft about the axis, and a moving member that moves along the axis in response to rotation of the drive shaft and is coupled to the valve body section, and the control unit controls the stepping motor so that the valve body section moves in a movement range in which the valve body surface and the valve seat surface maintain a non-contact state, in accordance with an excitation signal that changes by a micro step unit obtained by dividing a step by a predetermined division number.

According to the flow rate regulating device of the aspect of the present disclosure, the regulation mechanism regulates the distance along the axis between the valve body surface of the valve body section and the valve seat surface of the valve seat section to regulate a flow rate of a fluid. The valve body surface and the valve seat surface disposed opposite to the valve body surface are respective flat surfaces extending in the horizontal direction. Even when assembly errors or dimensional errors of members constituting the valve body section and members constituting the valve seat section are generated, the valve body surface is not inserted into the channel opening, and therefore maintains a close and non-contact state to the valve seat surface disposed around the channel opening. Since the valve body surface and the valve seat surface maintain the non-contact state, the valve body surface does not come in contact with the valve seat surface and any particles are not generated. Therefore, it is possible to inhibit the generation of the particles when the assembly errors or dimensional errors of the members constituting the valve body section and the members constituting the valve seat section are generated.

Furthermore, according to the flow rate regulating device of the aspect of the present disclosure, the valve body section is coupled to the moving member that moves along the axis in response to the rotation of the drive shaft of the stepping motor, and the stepping motor is controlled in accordance with the excitation signal that changes by the micro step unit obtained by dividing the step by the predetermined division number. When the stepping motor is controlled in accordance with the excitation signal of a full step or a half step, a minimum movement amount of the valve body surface along the axis is large, and hence, a minimum change amount of the flow rate of the fluid increases. Consequently, the flow rate cannot be accurately regulated.

On the other hand, in the flow rate regulating device according to the aspect of the present disclosure, since the minimum movement amount of the valve body surface along the axis is small, the minimum change amount of the flow rate of the fluid decreases. Consequently, the flow rate can be accurately regulated.

In consequence, according to the flow rate regulating device of the aspect of the present disclosure, it is possible to inhibit the generation of the particles when the assembly errors or dimensional errors of the members constituting the valve body section and the members constituting the valve seat section are generated, and it is also possible to accurately regulate the flow rate of the fluid.

In the flow rate regulating device according to the aspect of the present disclosure, preferably, the control unit sets the predetermined division number so that the change of the flow rate per minute due to the movement amount of the valve body surface along the axis at one micro step satisfies 0.01 mL or more and 0.05 mL or less.

The predetermined division number is set so that the change of the flow rate per minute due to the movement amount of the valve body surface along the axis at the micro step satisfies 0.05 mL or less. Consequently, the minimum movement amount of the valve body surface along the axis and the minimum change amount of the flow rate of the fluid can be sufficiently decreased, and a steady change of the flow rate (a difference between an actual flow rate and a target flow rate) can be decreased. Furthermore, when the predetermined division number is set so that the change of the flow rate per minute due to the movement amount of the valve body surface along the axis at the micro step satisfies 0.01 mL or more, the flow rate change amount can be inhibited from being excessively decreased, and responsiveness to the target flow rate can improve.

In the flow rate regulating device according to the aspect of the present disclosure, preferably, the channel opening is formed in a round shape about the axis in planar view, the valve body surface is formed in a round shape about the axis in planar view, the valve seat surface is formed in an annular shape that surrounds the channel opening about the axis in planar view, and r2≥3·r1 is satisfied in which r1 is a radius of the channel opening, and r2 is a radius of either smaller one of the valve body surface and the valve seat surface.

The radius r2 of the either smaller one of the valve body surface and the valve seat surface is set to three times or more the radius r1 of the channel opening, so that an area of a wall surface of the channel formed between the valve body surface and the valve seat surface is sufficiently acquired. The wall surface of the channel between the valve body surface and the valve seat surface provides frictional loss to the fluid to decrease a flow velocity of the fluid. Therefore, the change amount of the flow rate of the fluid to the movement amount of the valve body surface along the axis can be decreased, and the flow rate can be accurately regulated.

The flow rate regulating device according to the aspect of the present disclosure preferably has an inflow channel that guides the fluid to the inner channel and is formed in a round shape in cross-sectional view, wherein the inner channel is formed in a round shape in cross-sectional view, and a diameter of a cross section of the inner channel is set to ⅒ or more and ⅓ or less of a diameter of a cross section of the inflow channel.

Thus, the diameter of the cross section of the inner channel is set to ⅒ or more of the diameter of the cross section of the inflow channel, so that a cross-sectional area of the inner channel can be inhibited from being excessively decreased and a maximum flow rate of the fluid flowing through the channel per unit time can be inhibited from being excessively decreased. Furthermore, the diameter of the cross section of the inner channel is set to ⅓ or less of the diameter of the cross section of the inflow channel, so that the cross-sectional area of the inner channel can be inhibited from being excessively increased and the change of the flow rate to a movement amount of the valve body section can be inhibited from being excessively increased.

There is provided a control method of a flow rate regulating device according to another aspect of the present disclosure, the flow rate regulating device including a valve body section that moves along an axis extending in a vertical direction in a valve chamber and has a flat valve body surface extending in a horizontal direction, a valve seat section having a flat valve seat surface provided around a channel opening that communicates with an inner channel and the valve chamber, disposed at a position opposite to the valve body surface and extending in the horizontal direction, and a regulation mechanism that moves the valve body section along the axis to regulate a distance between the valve body surface and the valve seat surface, wherein the regulation mechanism has a stepping motor that rotates a drive shaft about the axis, and a moving member that moves along the axis in response to the rotation of the drive shaft and is coupled to the valve body section, the method including a control step of controlling the stepping motor, wherein in the control step, the stepping motor is controlled so that the valve body section moves in a range in which the valve body surface and the valve seat surface maintain a non-contact state, in accordance with an excitation signal that changes by a micro step unit obtained by dividing a step by a predetermined division number.

According to the control method of the flow rate regulating device of the aspect of the present disclosure, it is possible to inhibit the generation of the particles when the assembly errors or dimensional errors of the members constituting the valve body section and the members constituting the valve seat section are generated, and it is also possible to accurately regulate the flow rate of the fluid.

Advantageous Effects

According to the present disclosure, there are provided a flow rate regulating device and a control method of the device that can inhibit generation of particles when assembly errors or dimensional errors of members constituting a valve body section and members constituting a valve seat section are generated, and can accurately regulate a flow rate of a fluid.

DESCRIPTION OF EMBODIMENTS

Hereinafter, preferable embodiments of the present disclosure will be described in detail with reference to the drawings. Note that the embodiments described below are preferable specific examples of the present disclosure, and are therefore technically preferably variously limited. Furthermore, similar components are denoted with similar reference signs through respective drawings and detailed description thereof is appropriately omitted.

Figure 1:
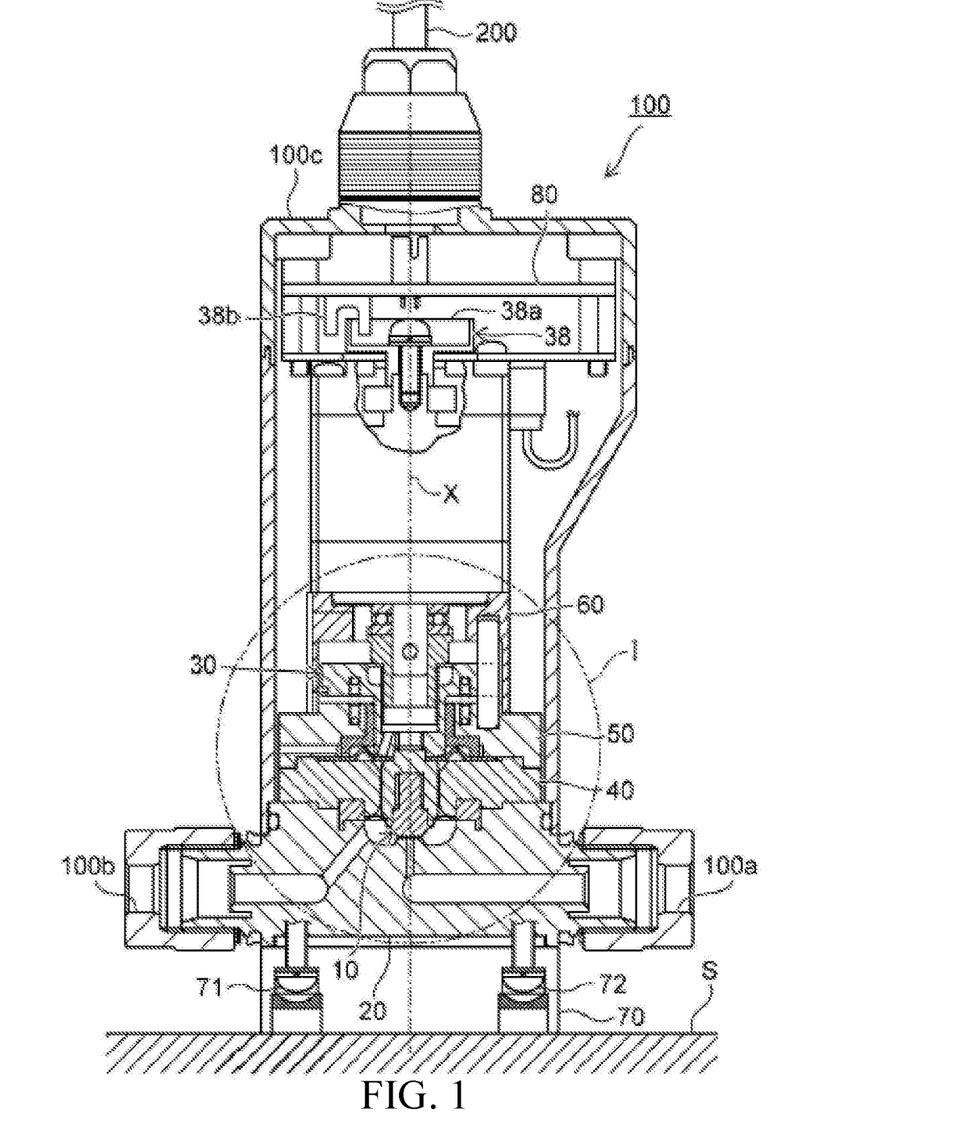
FIG. 1 is a partially longitudinal cross-sectional view showing a flow rate regulating device of one embodiment.

Hereinafter, an embodiment of the present disclosure will be described with reference to FIG. 1. FIG. 1 is a partially longitudinal cross-sectional view showing a flow rate regulating device 100 of the present embodiment. The flow rate regulating device 100 of the present embodiment is a device that regulates a flow rate of a fluid flowing inside from an inflow port 100a via an external pipe (not shown), and flows through an inner channel to flow outside from an outflow port 100b to the external pipe (not shown). Examples of the fluid having the flow rate to be regulated by the flow rate regulating device 100 of the present embodiment include a chemical solution for use in a semiconductor manufacturing apparatus, and a liquid such as pure water. Furthermore, an example of a temperature of the fluid is a temperature in a normal temperature range (e.g., 10° C. or more and less than 50° C.)

As shown in FIG. 1, the flow rate regulating device 100 of the present embodiment includes a valve body section 10 that is a diaphragm integrated type valve body, a main body section 20 having an inner channel, a movement mechanism (regulation mechanism) 30 that moves the valve body section 10 along an axis X, a fixing member 40 that fixes the valve body section 10 to the main body section 20, a support section 50 that supports the valve body section 10 so that the valve body section moves along the axis X, a motor support member 60 that supports a stepping motor 31 of the movement mechanism 30, a base section 70 installed on an installation surface S, and a control substrate (a control unit) 80 that controls the movement mechanism 30.

As shown in FIG. 1, the valve body section 10, the movement mechanism 30, the fixing member 40, the support section 50, the motor support member 60 and the control substrate 80 are accommodated in a cover member 100c installed above the main body section 20. The control substrate 80 transmits and receives various signals between an external device (not shown) and the control substrate, and receives power supply from the external device, via a cable 200. The main body section 20, the fixing member 40, the support section 50, the motor support member 60 and the base section 70 are fastened and integrated by a fastening bolt 71 and a fastening bolt 72 extending along the axis X.

Figure 2:
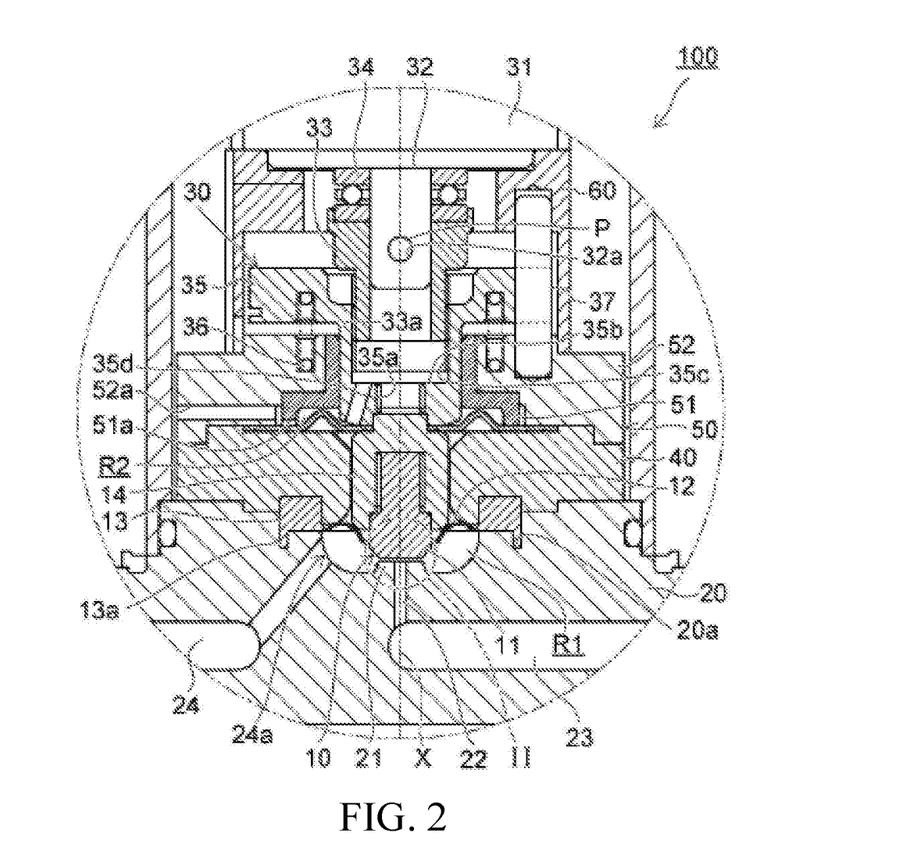
FIG. 2 is a partially enlarged view of part I of the flow rate regulating device shown in FIG. 1.

Hereinafter, respective components included in the flow rate regulating device 100 of the present embodiment will be described. FIG. 2 is a partially enlarged view of part I of the flow rate regulating device 100 shown in FIG. 1.

As shown in FIG. 2, the valve body section 10 moves along the axis X extending in a vertical direction in a valve chamber R1, to regulate the flow rate of the fluid flowing into the valve chamber R1 from an introduction channel 22 provided in a valve seat section 21. A distance between the valve body section 10 and the valve seat section 21 is regulated by the movement mechanism 30 described later.

The valve body section 10 has a base 11 formed in an axial shape along the axis X, a diaphragm portion (thin film portion) 12 coupled to an outer peripheral surface of the base 11 and formed in an annular thin film shape about the axis X, an annular portion 13 having an inner peripheral surface to which an outer peripheral end of the diaphragm portion 12 is coupled, and being formed in an annular shape, and a coupling portion 14 that couples the base 11 to the movement mechanism 30.

The base 11, the diaphragm portion 12 and the annular portion 13 are integrally made of a single material. As a material of the valve body section 10, it is desirable to use a fluorine resin material having a high chemical resistance, such as polytetrafluoroethylene (PTFE) or perfluoroalkoxy alkane (PFA). The annular portion 13 is provided with an annular protrusion 13a that is formed in an endless state along a circumferential direction about the axis X and that protrudes downward along the axis X. On the other hand, the main body section 20 disposed at a position opposite to the valve body section 10 is provided with an annular groove 20a that is formed in an endless state along the circumferential direction about the axis X and that opens upward along the axis X. The annular protrusion 13a and the annular groove 20a are formed to have the same radius to the axis X.

When the flow rate regulating device 100 of the present embodiment is assembled, the annular protrusion 13a of the valve body section 10 is pressed into the annular groove 20a of the main body section 20. Consequently, the annular groove 20a and the annular protrusion 13a are closely in contact with each other, and this close contact region constitutes a seal region that inhibits the fluid from flowing outside from the valve chamber R1. Furthermore, a central axis of the base 11 of the valve body section 10 is matched with the axis X. The valve body section 10 is fixed to the main body section 20, thereby forming the valve chamber R1 defined by the valve body section 10 and the main body section 20.

As shown in FIG. 2, the main body section 20 has the valve seat section 21 disposed at the position opposite to the valve body section 10, the introduction channel (an inner channel) 22 that introduces the fluid flowing inside from the inflow port 100a into the valve chamber R1, an inflow channel 23 through which the fluid flowing inside from the inflow port 100a flows and is guided to the introduction channel 22, and an outflow channel 24 that guides the fluid flowing outside from the valve chamber R1 through an outflow opening 24a to the outflow port 100b. The main body section 20 is integrally made of a single material. As the material of the main body section 20, it is desirable to use a fluorine resin material having a high chemical resistance, such as polytetrafluoroethylene (PTFE) or perfluoroalkoxy alkane (PFA).

The introduction channel 22 is a channel extending in the vertical direction along the axis X and formed in a round shape in cross-sectional view. Each of the inflow channel 23 and the outflow channel 24 is a channel extending in a horizontal direction that is perpendicular to the axis X and formed in a round shape in cross-sectional view. The introduction channel 22 communicates with an inflow opening 22a to regulate the flow rate, and therefore has a channel cross-sectional area that is smaller than a cross-sectional area of each of the inflow channel 23 and the outflow channel 24. It is desirable that a diameter of a cross section of the introduction channel 22 in the horizontal direction is set to ⅒ or more and ⅓ or less of a diameter of a cross section of the inflow channel 23.

Thus, the diameter of the cross section of the introduction channel 22 is set to ⅒ or more of the diameter of the cross section of the inflow channel 23, so that the cross-sectional area of the introduction channel 22 can be inhibited from being excessively decreased and a maximum flow rate of the fluid flowing through the channel per unit time can be inhibited from being excessively decreased. Alternatively, the diameter of the cross section of the introduction channel 22 is set to ⅓ or less of the diameter of the cross section of the inflow channel 23, so that the cross-sectional area of the introduction channel 22 can be inhibited from being excessively increased and change of the flow rate to a movement amount of the valve body section 10 can be inhibited from being excessively increased.

The movement mechanism 30 is a mechanism that moves the valve body section 10 along the axis X, to regulate the distance between the valve body section 10 and the valve seat section 21 of the main body section 20 and thereby regulate a flow rate of the fluid guided from the introduction channel 22 into the valve chamber R1.

As shown in FIG. 2, the movement mechanism 30 has the stepping motor 31, a drive shaft 32 coupled to the stepping motor 31 to rotate about the axis X, a rotary member 33 that rotates integrally with the drive shaft 32, a thrust bearing 34 disposed to surround the drive shaft 32, a moving member 35 movable relatively to the rotary member 33 along the axis X, a spring 36 disposed between the moving member 35 and the support section 50, a detent member 37, and a position detecting unit 38 (see FIG. 1). The drive shaft 32, the rotary member 33, the thrust bearing 34 and the moving member 35 are made of a metal material (e.g., a stainless steel material such as SUS304, a carbon steel material such as S45C, or a carbon tool steel material such as SK4).

The stepping motor 31 is a drive mechanism that rotates the drive shaft 32 in accordance with a step-like (rectangular) excitation signal (excitation current) transmitted from the control substrate 80. As shown in FIG. 2, the drive shaft 32 is provided with a through hole 32a extending through the drive shaft in the horizontal direction perpendicular to the axis X. The rotary member 33 is also provided with a through hole (not shown) extending through the member in the horizontal direction perpendicular to the axis X. A pin P is inserted into both the through hole 32a of the drive shaft 32 and the through hole of the rotary member 33, and the rotary member 33 rotates integrally with the drive shaft 32 about the axis X.

As shown in FIG. 2, the rotary member 33 is formed in a cylindrical shape extending along the axis X, and is provided with an external thread 33a on an outer peripheral surface of a lower half portion of the member. The external thread 33a is provided to move the moving member 35 relatively to the rotary member 33 while coupling the rotary member 33 to the moving member 35.

The thrust bearing 34 is disposed to surround the drive shaft 32 between the rotary member 33 and the stepping motor 31. The thrust bearing 34 supports an urging force of the spring 36 or an urging force received from the fluid by the valve body section 10 and directed upward along the axis X, so that the rotary member 33 smoothly rotates regardless of such urging forces.

The moving member 35 is a member disposed along the axis X and coupled to the valve body section 10. On a lower end side of the moving member 35, a fastening hole 35a is provided to which the coupling portion 14 of the valve body section 10 is fastened, and on an upper end side of the member, a coupling hole 35b is provided to which the rotary member 33 is coupled. An external thread of an upper half portion of the base 11 of the valve body section 10 is fastened to an internal thread of the coupling portion 14. An external thread of an upper end of the coupling portion 14 is fastened to an internal thread of the fastening hole 35a of the moving member 35.

An inner peripheral surface of the coupling hole 35b of the moving member 35 is provided with an internal thread 35c coupled to the external thread 33a of the rotary member 33. The internal thread 35c is provided to move the moving member 35 relatively to the rotary member 33 while coupling the moving member 35 to the rotary member 33. An outer peripheral portion above the moving member 35 is provided with through holes (not shown) formed in a plurality of portions around the axis X (e.g., three portions at intervals of 120°) and extending in a direction parallel to the axis X.

The rod-like detent member 37 is inserted into the through hole, to inhibit the moving member 35 from rotating about the axis X. A lower end of the detent member 37 is inserted into an insertion hole formed in an upper surface of the support section 50. Since the lower end of the detent member 37 is inserted into the insertion hole, the moving member 35 is inhibited from rotating about the axis X.

As shown in FIG. 2, the moving member 35 is provided with a vent 35d that connects a space under the coupling hole 35b to a space R2 that communicates with outside. The vent 35d is a hole to maintain the space under the coupling hole 35b in an atmospheric pressure state, regardless of displacement of a relative position of the moving member 35 to the rotary member 33.

The spring 36 is a member inserted into an annular groove formed in an upper end surface of the support section 50 and an annular groove formed in the moving member 35, and the spring generates the urging force directed upward along the axis X in the moving member 35. The spring 36 provides the urging force to the moving member 35 coupled to the external thread 33a of the rotary member 33, to decrease positioning errors of the valve body section 10 due to backlash.

The position detecting unit 38 includes an encoder 38a coupled to the drive shaft 32 of the stepping motor 31 and formed in a round shape in planar view, and a photo interrupter 38b to detect slits provided at equal intervals in a plurality of portions of the encoder 38a in the circumferential direction. The photo interrupter 38b transmits, to the control substrate 80 described later, a number of rectangular pulse signals corresponding to a number of the slits passed by the interrupter.

The control substrate 80 can recognize both a rotation speed of the drive shaft 32 which is estimated from the pulse signal transmitted to the stepping motor 31, and a rotation speed of the drive shaft 32 which is estimated from the pulse signal output by the position detecting unit 38. When these rotation speeds are not matched, the control substrate 80 can recognize that a defect such as step-out is generated in the stepping motor 31.

The movement mechanism 30 having the aforementioned configuration operates as follows to move the valve body section 10 along the axis X. The movement mechanism 30 rotates the drive shaft 32 and the rotary member 33 coupled to the drive shaft about the axis X by the stepping motor 31. The moving member 35 provided with the internal thread 35c coupled to the external thread 33a formed on the outer peripheral surface of the rotary member 33 is inhibited from rotating about the axis X by the detent member 37.

Consequently, when the rotary member 33 rotates about the axis X in response to the rotation of the drive shaft 32, the moving member 35 moves upward or downward along the axis X in accordance with a rotating direction of the rotary member. Since the valve body section 10 is coupled to the moving member 35, the valve body section moves upward or downward along the axis X in accordance with the movement of the moving member 35.

The fixing member 40 is formed in a plate shape about the axis X, and this member fixes the valve body section 10 attached to the main body section 20. The fixing member 40 is provided with an insertion hole opened around the axis X, into which the coupling portion 14 of the valve body section 10 can be inserted.

The support section 50 supports the moving member 35 of the movement mechanism 30 so that the moving member moves along the axis X. The support section 50 has a tubular first support member 51 disposed close to the outer peripheral surface of the moving member 35, and a second support member 52 disposed on an outer peripheral side of the first support member 51.

The first support member 51 has an inner peripheral surface having an inner diameter larger than an outer diameter of the moving member 35 at a position close to the moving member 35. A difference between the outer diameter of the moving member 35 and the inner diameter of the first support member 51 is set to a value that is as micro as possible, while enabling smooth movement of the moving member 35 along the axis X. The inner peripheral surface of the first support member 51 has a cylindrical shape extending in a certain range along the axis X.

When the movement mechanism 30 moves the valve body section 10 along the axis X, the first support member 51 regulates the valve body section 10 so that the valve body section does not shift in the horizontal direction perpendicular to the axis X. The first support member 51 is desirably made of a material having a hardness lower than a hardness of the moving member 35, to suppress a frictional force during contact with the moving member 35. It is preferable that the first support member 51 is made of, for example, brass as an alloy of copper and zinc.

As shown in FIG. 2, the first support member 51 is provided with a vent groove 51a that communicates with the space R2, and the second support member 52 is provided with a vent hole 52a that communicates with the vent groove 51a. The vent hole 52a is opened to atmosphere. Consequently, the space R2 that communicates with the vent hole 52a and the vent groove 51a is maintained at an atmospheric pressure. In consequence, the space R2 opposite to the valve chamber R1 through which the fluid flows via the diaphragm portion 12 is maintained in the atmospheric pressure state.

The motor support member 60 is coupled to the stepping motor 31 by a fastening bolt (not shown). A lower end of the motor support member 60 is supported on an upper surface of the second support member 52. Consequently, the motor support member supports the stepping motor 31 so that the stepping motor 31 is disposed at a certain position from the support section 50.

The base section 70 is a member installed on the installation surface S, and is fixed to the installation surface S, for example, by a fastening bolt (not shown). As shown in FIG. 1, the fastening bolt 71 and the fastening bolt 72 are fastened from downside of the base section 70, to integrate the main body section 20, the fixing member 40, the support section 50, the motor support member 60, and the base section 70.

The control substrate 80 is connected to the external device (not shown) via the cable 200, to receive the power supply from the external device via the cable 200 and to transmit and receive various signals between the external device and the control substrate. The signal received from the external device is, for example, a signal indicating a set value of a target flow rate to be regulated by the flow rate regulating device 100. Upon receiving the signal indicating the set value of the target flow rate, the control substrate 80 generates the pulse signal to rotate the stepping motor 31, thereby moving the valve body section 10 to a desired position, and transmits the signal to the stepping motor 31.

Figure 3:
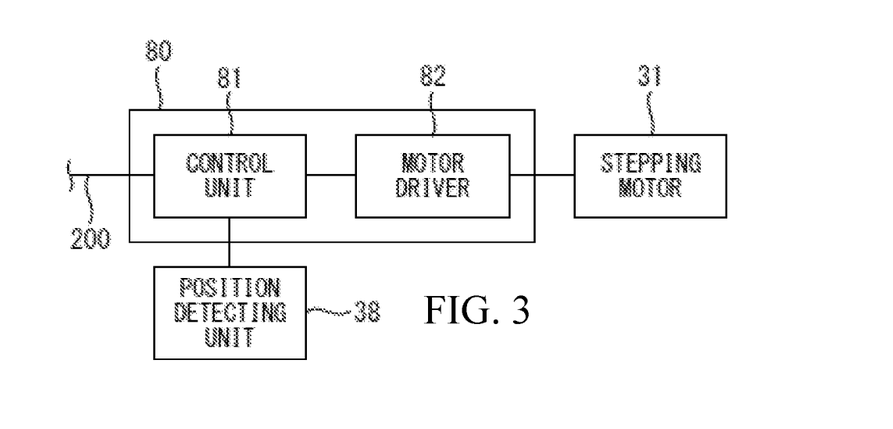
FIG. 3 is a functional block diagram showing a configuration of a control substrate shown in FIG. 1.

FIG. 3 is a functional block diagram showing a configuration of the control substrate 80. As shown in FIG. 3, the control substrate 80 includes a control unit 81 and a motor driver 82. The control unit 81 has a computation processing unit such as a central processing unit (CPU), and transmits and receives the signal between the external device and the control unit and transmits, to the motor driver 82, the rectangular pulse signal to control the stepping motor 31, via the cable 200. The control unit 81 can detect the rotation speed of the drive shaft 32 from the pulse signal transmitted from the position detecting unit 38 coupled to the drive shaft 32 of the stepping motor 31.

The motor driver 82 is a drive circuit that generates a micro step excitation current (excitation signal) in response to the pulse signal received from the control unit 81, to output the current to the stepping motor 31. The motor driver 82 generates the excitation current that changes in a stepwise manner by a micro step unit obtained by dividing a step by a predetermined division number when the stepping motor 31 is driven at a full step, to control the stepping motor 31. Here, the predetermined division number is, for example, 256.

Figure 4:
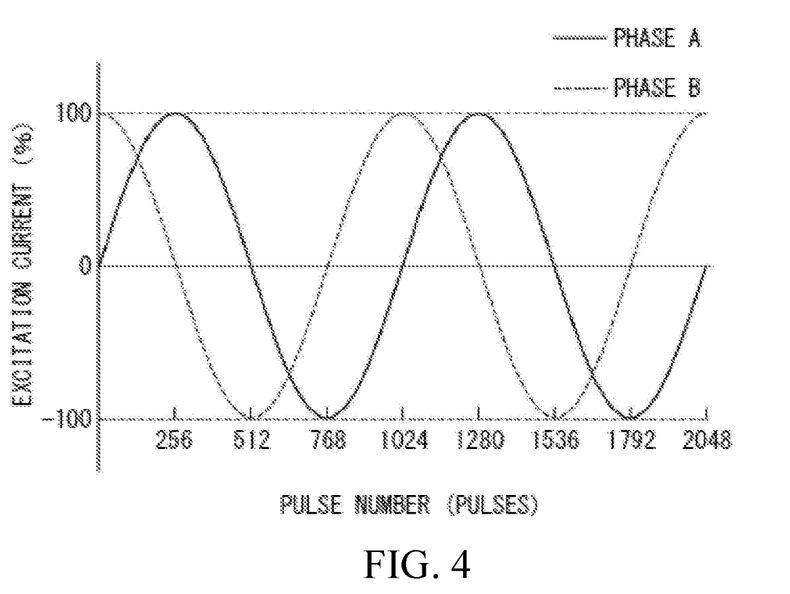
FIG. 4 is a diagram showing a relation between a pulse number of a pulse signal to be output to a motor driver by a control unit and an excitation current to be output to a stepping motor by the motor driver.

The stepping motor 31 of the present embodiment is a two-phase stepping motor in which a rotation angle of one step is 1.8° when the motor is driven at the full step. FIG. 4 is a diagram showing a relation between a pulse number of the pulse signal to be output to the motor driver by the control unit of the present embodiment and the excitation current to be output to the stepping motor 31 by the motor driver 82. As shown in FIG. 4, the motor driver 82 outputs the excitation current of a sine waveform to each of two-phase coils of phase A and phase B (not shown). The sine waveform shown in FIG. 4 microscopically has such a shape that the excitation current changes in the stepwise manner every pulse.

Figure 5:
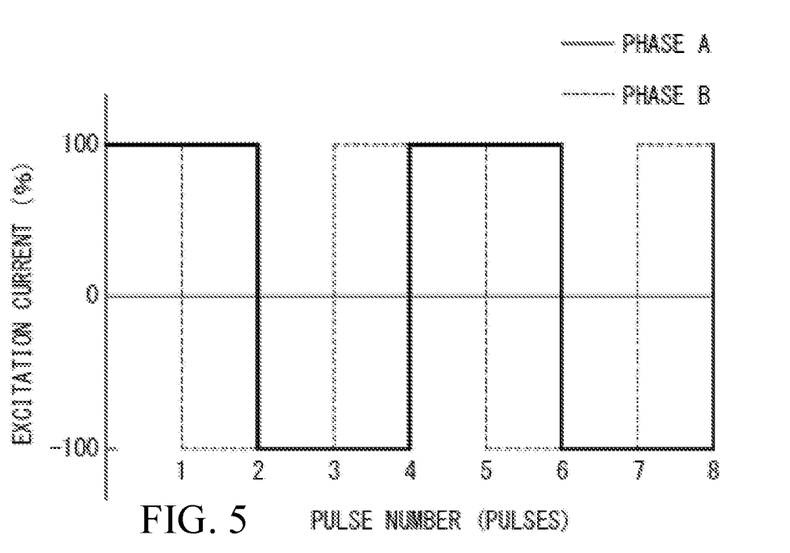
FIG. 5 is a diagram showing a comparative example of the relation between the pulse number of the pulse signal to be output to the motor driver by the control unit and the excitation current to be output to the stepping motor by the motor driver.

FIG. 5 is a diagram showing a comparative example of the relation between the pulse number of the pulse signal to be output to the motor driver 82 by the control unit 81 and the excitation current to be output to the stepping motor 31 by the motor driver 82. FIG. 5 shows an example where the motor driver 82 controls the stepping motor 31 by the full step drive of two-phase excitation.

One step of the full step drive shown in the comparative example of FIG. 5 corresponds to 256 steps of the micro step drive shown in FIG. 4. In the full step drive of FIG. 5, the rotation angle changes by 1.8° at one step, whereas in the micro step drive of FIG. 4, the rotation angle changes by 1.8° at 256 steps. In the micro step drive in which the division number is 256, the rotation angle that changes at one step is 1.8°/256=0.00703125°.

Figure 6:
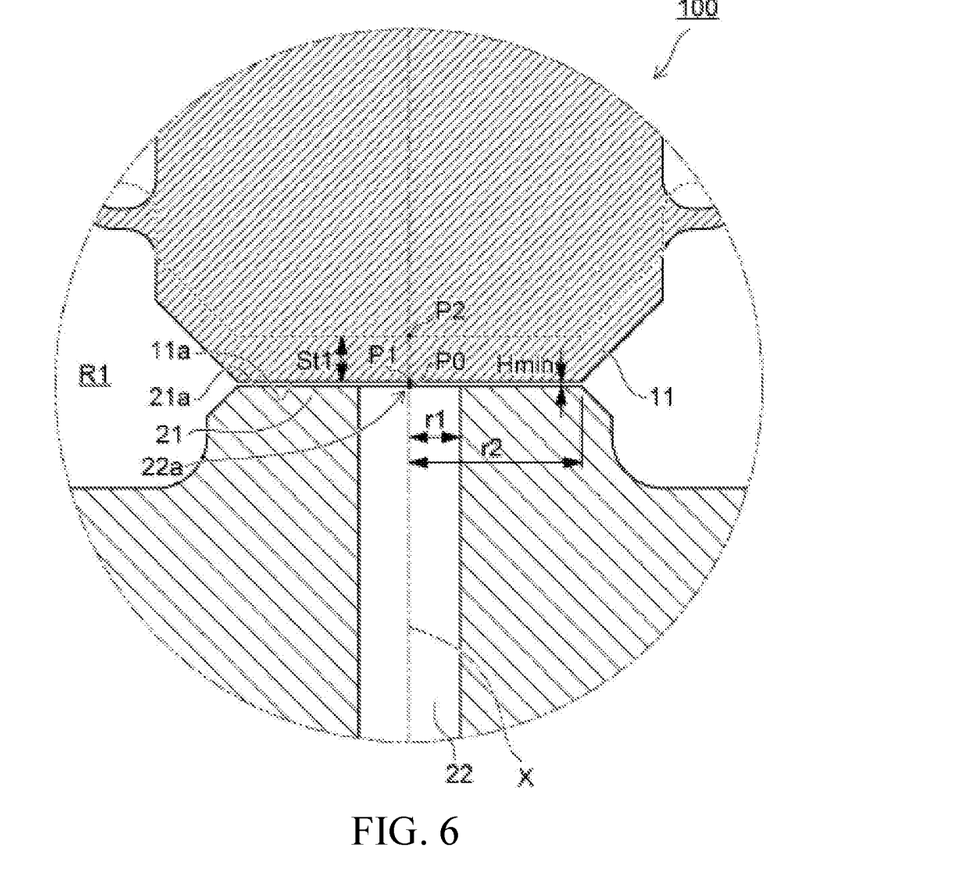
FIG. 6 is a partially enlarged view of part II of the flow rate regulating device shown in FIG. 2.
Figure 7:
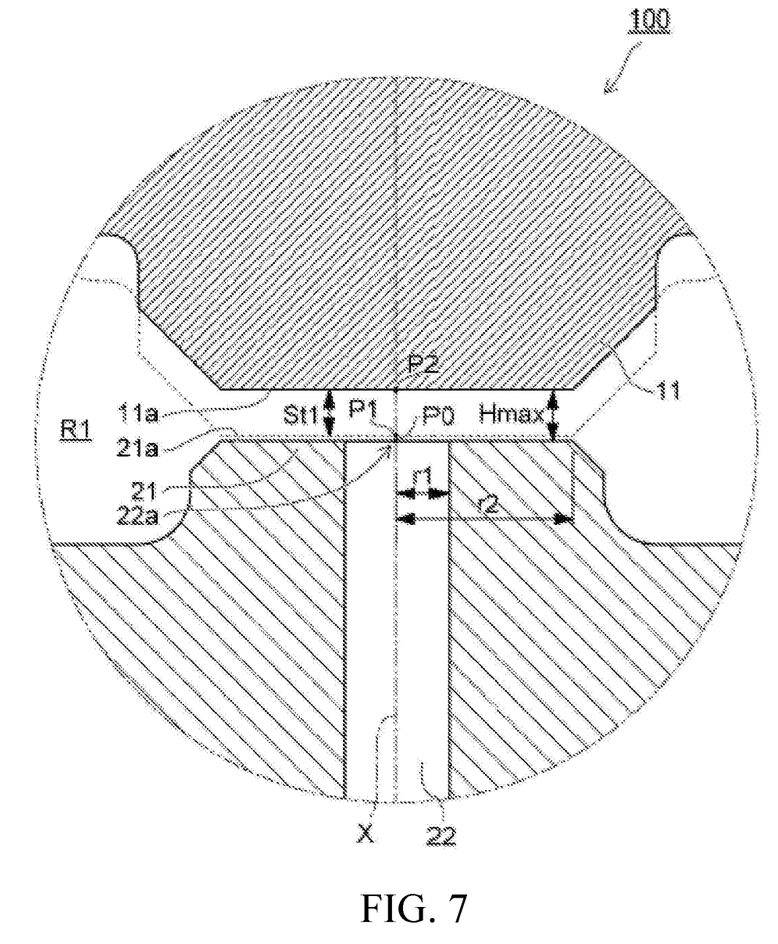
FIG. 7 is a partially enlarged view of the part II of the flow rate regulating device shown in FIG. 2.
Figure 8:
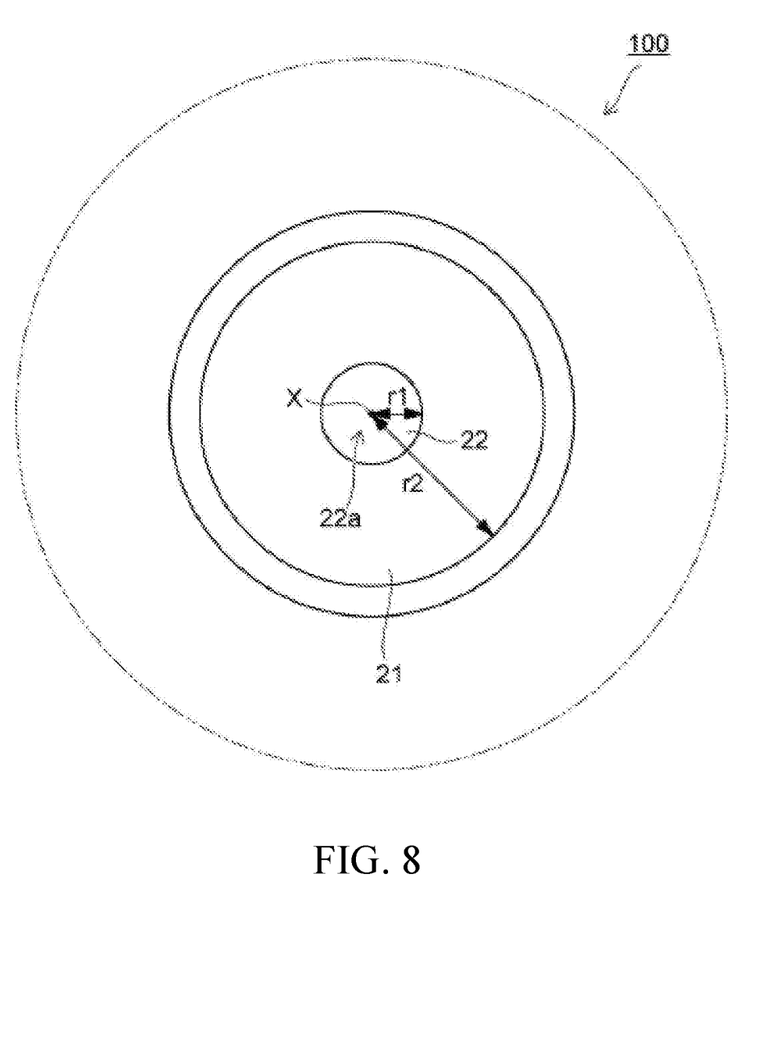
FIG. 8 is a plan view of a valve seat section shown in FIG. 2 and seen from above along an axis.

Next, a structure to regulate the flow rate of the fluid by the valve body section 10 included in the flow rate regulating device 100 of the present embodiment will be described with reference to FIG. 6 to FIG. 8. FIG. 6 and FIG. 7 are partially enlarged views of part II of the flow rate regulating device 100 shown in FIG. 2. FIG. 6 shows a state where the flow rate of the fluid flowing from the introduction channel 22 into the valve chamber R1 is set to a minimum value. On the other hand, FIG. 7 shows a state where the flow rate of the fluid flowing from the introduction channel 22 into the valve chamber R1 is set to a maximum value. FIG. 8 is a plan view of the valve seat section 21 shown in FIG. 2 and seen from above along the axis X.

As shown in FIG. 6 and FIG. 7, the base 11 of the valve body section 10 has a flat valve body surface 11a extending in the horizontal direction. The valve seat section 21 of the main body section 20 has a flat valve seat surface 21a disposed at a position opposite to the valve body surface 11a and extending in the horizontal direction. The valve seat surface 21a is disposed around the inflow opening (channel opening) 22a that communicates with the introduction channel 22 and the valve chamber R1. When the valve body section 10 is moved upward and downward along the axis X by the movement mechanism 30, a distance along the axis X between the valve body surface 11a and the valve seat surface 21a is regulated.

A space between the valve body surface 11a and the valve seat surface 21a is a channel through which the fluid flowing out from the inflow opening 22a into the valve chamber R1 flows. Consequently, when particles adhere on the valve body surface 11a and the valve seat surface 21a, there is possibility that the particles are mixed as impurities in the fluid. To inhibit the particles from adhering on the valve body surface 11a and the valve seat surface 21a, the surfaces are formed to set an arithmetic average roughness Ra of each of the surfaces to 0.1 μm or less.

FIG. 6 shows a state where the flow rate of the fluid flowing from the introduction channel 22 into the valve chamber R1 is set to a minimum value. A distance from a position P0 of the valve seat surface 21a on the axis X to a lowermost end position P1 of the valve body surface 11a is Hmin. The distance Hmin is a value larger than 0, and hence, the valve body surface 11a and the valve seat surface 21a maintain a non-contact state.

FIG. 7 shows a state where the flow rate of the fluid flowing from the introduction channel 22 into the valve chamber R1 is set to a maximum value. A distance from a position P0 of the valve seat surface 21a on the axis X to an uppermost end position P2 of the valve body surface 11a is Hmax. A movement range St1 from the lowermost end position P1 to the uppermost end position P2 of the valve body surface 11a is a range from the distance Hmin to the distance Hmax.

When a radius of the inflow opening 22a is r1, a channel cross-sectional area of the inflow opening 22a is $\Pi(r1)^2$. When the valve body surface 11a is moved from the position P1 to the position P2, a change amount of a minimum channel cross-sectional area of a channel formed between the valve body surface 11a and the valve seat surface 21a is $2\Pi \cdot r1 \cdot St1$. When the change amount $2\Pi \cdot r1 \cdot St1$ is in excess of a channel cross-sectional area of the inflow opening 22a, the flow rate of the fluid flowing from the inflow opening 22a into the valve chamber R1 per unit time is maximum. That is, the movement range St1 is excessively increased. Even in this case, when the surface is beyond a position where the flow rate of the fluid flowing into the valve chamber R1 is maximum, the flow rate cannot be regulated.

Therefore, it is desirable to set the movement range St1 so that the channel cross-sectional area of the inflow opening 22a substantially matches the change amount of the minimum channel cross-sectional area of the channel formed between the valve body surface 11a and the valve seat surface 21a when the valve body surface 11a is moved from the position P1 to the position P2. Specifically, it is desirable to set the movement range St1 so that $\Pi \cdot (r1)^2$ substantially matches $2\Pi \cdot r1 \cdot St1$.

The movement range St1 is 0.5 times the radius r1 of the inflow opening 22a (0.25 times a diameter of the inflow opening 22a). For example, when the diameter of the inflow opening 22a (a port diameter) is 0.5 mm, it is desirable to set the movement range St1 to about 0.13 mm. Furthermore, when the diameter of the inflow opening 22a (the port diameter) is 2.0 mm, it is desirable to set the movement range St1 to about 0.50 mm.

Furthermore, it is desirable to set the movement range SU so that the encoder 38a of the position detecting unit 38 does not rotate once about an axis X1 when the valve body surface 11a is moved from the position P1 to the position P2. Consequently, the number of the pulse signals detected by the photo interrupter 38b of the position detecting unit 38 can be easily associated with the position of the valve body surface 11a on the axis X, and the position of the valve body surface 11a can be recognized.

The control substrate 80 of the present embodiment controls the stepping motor 31 so that the valve body section 10 moves in the movement range St1 in which the valve body surface 11a and the valve seat surface 21a maintain the non-contact state. Specifically, the control substrate 80 controls the stepping motor 31 so that the position of the valve body surface 11a on the axis X is not below the lowermost end position P1 above the valve seat surface 21a and is not above the uppermost end position P2.

The position of the valve body surface 11a on the axis X is controlled so that the position is not below the lowermost end position P1, to inhibit the valve body surface 11a from being brought into contact with the valve seat surface 21a and to inhibit a part of the material of the valve body surface 11a and the valve seat surface 21a from being discharged as the particles (e.g., fine particles having a particle diameter of 20 nm or less).

The lowermost end position P1 is, for example, beforehand regulated at a position where the flow rate of the fluid flowing out from the outflow port 100b to an external pipe per unit time has a predetermined minimum value. The control substrate 80 sets the valve body surface 11a to an initial position by initialization processing after the power supply is received, and can detect, by the encoder 38a, the rotation angle of the drive shaft 32 that rotates after the initialization processing. The control substrate 80 reads the pulse number corresponding to the lowermost end position P1 which is stored in a storage unit (not shown), and drives the stepping motor 31 in accordance with the pulse number to rotate the drive shaft 32 from an initialized position, so that the valve body surface 11a can be moved to a position of the distance Hmin from the valve seat surface 21a.

In the present embodiment, the movement amount of the valve body surface 11a along the axis X at one micro step is St2. When a value of the movement amount St2 is excessively large, the flow rate of the fluid that fluctuates at the micro step increases, and a difference of an actual flow rate from the target flow rate increases, thereby worsening followability to the target flow rate. Furthermore, when the value of the movement amount St2 is excessively small, the flow rate of the fluid that fluctuates at the micro step decreases, and time required until the target flow rate is reached lengthens, thereby worsening responsiveness.

Inventors have studied a relation between the movement amount St2 of the valve body surface 11a along the axis X at one micro step and the flow rate of the fluid passing the introduction channel 22 per minute, and have found that, when change of the flow rate of the fluid passing the introduction channel 22 per minute due to the movement amount St2 satisfies 0.01 mL or more and 0.05 mL or less, the followability and responsiveness to the target flow rate can be suitably maintained.

In the present embodiment, when the predetermined division number of the micro step drive is set to 32 or more and 512 or less (e.g., 256), the aforementioned conditions of the change of the flow rate are satisfied. A lower limit is provided to the predetermined division number, because when the predetermined division number is excessively small, the change of the flow rate during the movement of the valve body section 10 at one micro step excessively increases, thereby worsening the followability of the flow rate of the fluid to the target flow rate. An upper limit is provided to the predetermined division number, because when the predetermined division number is excessively large, the number of the micro steps required to move the valve body section 10 excessively increases, thereby worsening responsiveness.

As shown in FIG. 8, the inflow opening 22a is formed in a round shape about the axis X in planar view. The valve seat surface 21a is formed in an annular shape that surrounds the inflow opening 22a about the axis X in planar view. The valve body surface 11a is formed in a round shape about the axis X in planar view. A relation $3 \cdot r1 \leq r2 \leq 8 \cdot r1$ is satisfied in which r1 is the radius of the inflow opening 22a, and r2 is a radius of each of the valve body surface 11a and the valve seat surface 21a.

The radius r2 of each of the valve body surface 11a and the valve seat surface 21a is set to three times or more the radius r1 of the inflow opening 22a, so that an area of a wall surface of the channel formed between the valve body surface 11a and the valve seat surface 21a is sufficiently acquired. The wall surface of the channel between the valve body surface 11a and the valve seat surface 21a provides frictional loss to the fluid to decrease a flow velocity of the fluid. In the example shown in FIG. 3 to FIG. 5, the radius of each of the valve body surface 11a and the valve seat surface 21a is the same radius r2. However, when the radius of the valve body surface 11a is different from the radius of the valve seat surface 21a, the radius of either smaller one of the valve body surface 11a and the valve seat surface 21a is set to r2.

The radius r2 of each of the valve body surface 11a and the valve seat surface 21a is set to eight times or less the radius r1 of the inflow opening 22a, so that a surface area of each of the valve body surface 11a and the valve seat surface 21a can be inhibited from being excessively increased. When the surface area of each of the valve body surface 11a and the valve seat surface 21a excessively increases, it is difficult to accurately process these surfaces so that the arithmetic average roughness Ra is 0.1 µm or less. Alternatively, time required to accurately process these surfaces so that the arithmetic average roughness Ra is 0.1 µm or less lengthens, thereby worsening production efficiency.

Figure 9:
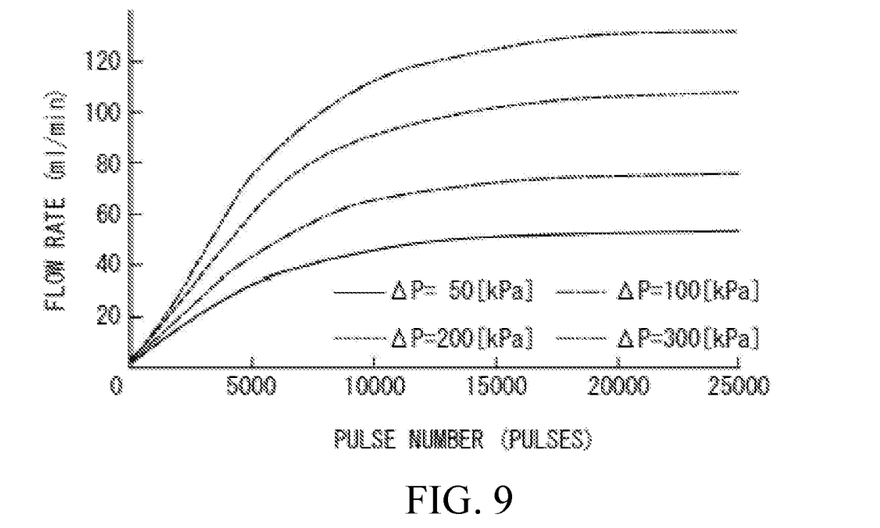
FIG. 9 is a graph showing a relation between a pulse number and a flow rate in the flow rate regulating device of the present embodiment.
Figure 10:
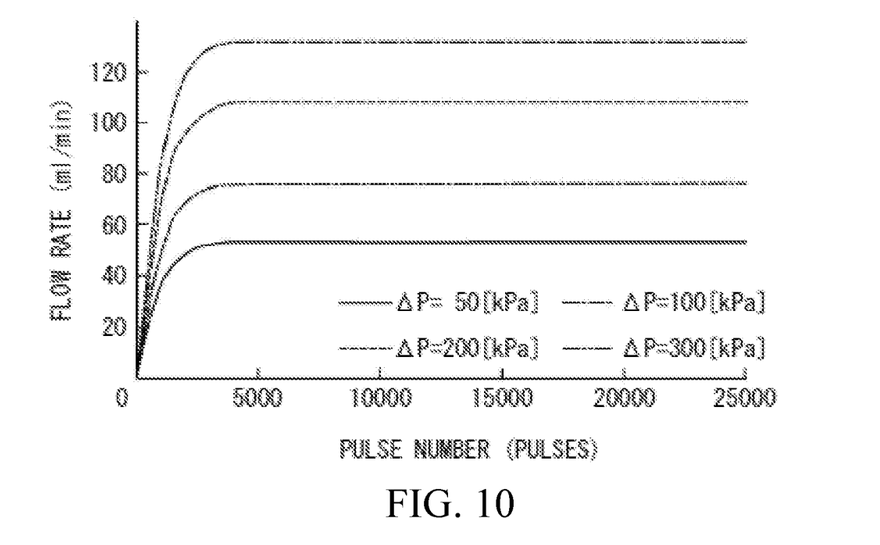
FIG. 10 is a graph showing a relation between a pulse number and a flow rate in a flow rate regulating device of the comparative example.

FIG. 9 is a graph showing a relation between the pulse number and the flow rate when the valve body surface 11a is moved from the lowermost end position P1 to the uppermost end position P2 by the micro step drive of the division number of 256 in the flow rate regulating device 100 of the present embodiment. FIG. 10 is a graph showing a relation between the pulse number and the flow rate when the valve body surface 11a is moved from the lowermost end position P1 to the uppermost end position P2 by the full step drive in a flow rate regulating device of the comparative example.

Each of the flow rates shown in FIG. 9 and FIG. 10 is measured in a pipe connected to the outflow port 100b of the flow rate regulating device 100 with a flowmeter (not shown). In FIG. 9 and FIG. 10, ΔP is a differential pressure between a pressure of the fluid in the inflow port 100a and a pressure of the fluid in the outflow port 100b.

As shown in FIG. 9, according to the flow rate regulating device 100 of the present embodiment, as the number of the pulses to be transmitted from the control unit 81 to the motor driver 82 increases from 0 to 25000, the flow rate of the fluid increases, and when the pulse number reaches 25000, the flow rate substantially does not change. According to the flow rate regulating device 100 of the present embodiment, the change of the flow rate is seen in a range of the pulse number from 0 to 25000, and hence, the flow rate can be regulated to obtain an optional target flow rate by inputting the pulse number from 0 to 25000.

On the other hand, as shown in FIG. 10, according to the flow rate regulating device of the comparative example, as a number of pulses to be transmitted from the control unit 81 to the motor driver 82 increases from 0 to 5000, the flow rate of the fluid increases, and when the pulse number reaches 5000, the flow rate substantially does not change. According to the flow rate regulating device 100 of the present embodiment, the change of the flow rate is seen in a range of the pulse number from 0 to 5000, but the flow rate hardly changes in a range of the pulse number from 5000 to 25000. Consequently, in the flow rate regulating device of the comparative example, the target flow rate has to be regulated in the limited number of the pulses from 0 to 5000. Consequently, the flow rate of the fluid that fluctuates at one pulse (one step) increases, and the difference of the actual flow rate from the target flow rate increases, thereby worsening the followability to the target flow rate.

Figure 11:
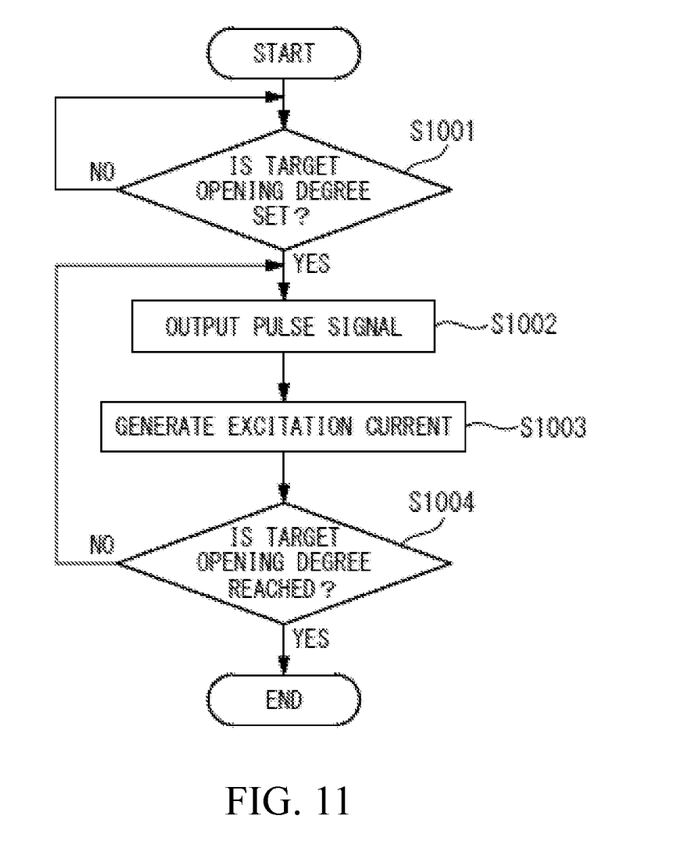
FIG. 11 is a flowchart showing processing to be executed by a control substrate.

Next, description will be made as to an operation of the control substrate 80 to drive the stepping motor 31 and move the valve body surface 11a to a predetermined target position. FIG. 11 is a flowchart showing processing to be executed by the control substrate 80.

In step S1001, the control unit 81 of the control substrate 80 analyzes the signal transmitted from the external device, and judges whether or not a target opening degree of the valve body section 10 is set. Upon receiving the signal to set the target opening degree from the external device, the control unit 81 judges that the target opening degree is set. The control substrate 80 calculates the pulse number required to move the valve body surface 11a from a current position to a target position corresponding to the target opening degree based on the target opening degree of the valve body section 10 included in the signal to set the target opening degree and a current opening degree of the valve body section 10.

Here, the current opening degree of the valve body section 10 is calculated from the number of the pulses of the pulse signal transmitted to the motor driver 82 from an initial state to a current state. This pulse number is, for example, a pulse number obtained by subtracting the pulse number of backward rotation from the pulse number of forward rotation.

In step S1002, the control unit 81 outputs, to the motor driver 82, the pulse signal for one pulse to drive the stepping motor 31 at the micro step.

In step S1003, the motor driver 82 generates the excitation current in response to the pulse signal received from the control unit 81, and outputs the current to the stepping motor 31. The stepping motor 31 is driven by the excitation current output from the motor driver 82.

In step S1004, the control unit 81 judges whether or not the position of the valve body surface 11a of the valve body section 10 reaches a position corresponding to the target opening degree. The control unit 81 judges whether or not the required pulse number calculated in the step S1001 is output in the step S1002. When the required number of the pulses are not output in the step S1002, the control unit 81 executes the step S1002 again. When the required number of the pulses are output in the step S1002, the control unit 81 ends the processing of the present flowchart.

In the processing shown in FIG. 11, the signal to set the target opening degree is received from the external device to set the target opening degree, but another configuration may be employed. For example, in the step S1001, the control unit 81 may receive a signal to set the target flow rate from the external device to set the target flow rate. In this case, the flowmeter (not shown) is installed in the pipe connected to the outflow port 100b, and the flow rate measured with the flowmeter may be received by the control substrate 80.

Then, the control unit 81 judges in the step S1004 whether or not the flow rate received from the flowmeter reaches the target flow rate. That is, the control unit 81 controls the position of the valve body surface 11a to the valve seat surface 21a so that the flow rate received from the flowmeter matches the target flow rate.

An operation and effect produced by the aforementioned flow rate regulating device 100 of the present embodiment will be described.

According to the flow rate regulating device 100 of the present embodiment, the movement mechanism 30 regulates the distance along the axis X between the valve body surface 11a of the valve body section 10 and the valve seat surface 21a of the valve seat section 21 to regulate the flow rate of the fluid. The valve body surface 11a and the valve seat surface 21a disposed opposite to the valve body surface are respective flat surfaces extending in the horizontal direction.

Consequently, even when assembly errors or dimensional errors of members constituting the valve body section 10 and members constituting the valve seat section 21 are generated, the valve body surface 11a is not inserted into the inflow opening 22a, and comes close to the valve seat surface 21a disposed around the opening in the non-contact state. Since the valve body surface 11a and the valve seat surface 21a maintain the non-contact state, the valve body surface 11a does not come in contact with the valve seat surface 21a and any particles are not generated. Therefore, it is possible to inhibit the generation of the particles when the assembly errors or dimensional errors of the members constituting the valve body section 10 and the members constituting the valve seat section 21 are generated.

Furthermore, according to the flow rate regulating device 100 of the present embodiment, the valve body section 10 is coupled to the moving member 35 that moves along the axis X in response to the rotation of the drive shaft 32 of the stepping motor 31, and the stepping motor 31 is controlled in accordance with the excitation signal (excitation current) that changes by the micro step unit obtained by dividing one step by the predetermined division number. When the stepping motor 31 is controlled in accordance with the excitation signal of the full step or a half step, the minimum movement amount of the valve body surface 11a along the axis X is large. Consequently, the minimum change amount of the flow rate of the fluid increases, and the flow rate cannot be accurately regulated.

On the other hand, in the flow rate regulating device 100 of the present embodiment, since the minimum movement amount of the valve body surface 11a along the axis X is small, the minimum change amount of the flow rate of the fluid decreases. Consequently, the flow rate can be accurately regulated.

In consequence, according to the flow rate regulating device 100 of present embodiment, it is possible to inhibit the generation of the particles when the assembly errors or dimensional errors of the members constituting the valve body section 10 and the members constituting the valve seat section 21 are generated, and it is also possible to accurately regulate the flow rate of the fluid.

In the flow rate regulating device 100 of the present embodiment, the predetermined division number is set so that the change of the flow rate per minute due to the movement amount St2 of the valve body surface 11a along the axis at one micro step satisfies 0.05 mL or less. Consequently, the minimum movement amount of the valve body surface along the axis and the minimum change amount of the flow rate of the fluid can be sufficiently decreased, and a steady change of the flow rate (the difference between the actual flow rate and the target flow rate) can be decreased. Furthermore, when the predetermined division number is set so that the change of the flow rate per minute due to the movement amount St2 satisfies 0.01 mL or more, the flow rate change amount can be inhibited from being excessively decreased, and the responsiveness to the target flow rate can improve.

In the flow rate regulating device 100 of the present embodiment, the radius r2 of each of the valve body surface 11a and the valve seat surface 21a is set to three times or more the radius r1 of the inflow opening 22a, so that the area of the wall surface of the channel formed between the valve body surface 11a and the valve seat surface 21a is sufficiently acquired. The wall surface of the channel between the valve body surface 11a and the valve seat surface 21a provides the frictional loss to the fluid to decrease the flow velocity of the fluid. Therefore, the change amount of the flow rate of the fluid to the movement amount of the valve body surface 11a along the axis X can be decreased, and the flow rate can be accurately regulated.

According to the flow rate regulating device 100 of the present embodiment, the diameter of the cross section of the introduction channel 22 is set to 1/10 or more of the diameter of the cross section of the inflow channel 23, so that the cross-sectional area of the introduction channel 22 can be inhibited from being excessively decreased and the maximum flow rate of the fluid flowing through the channel per unit time can be inhibited from being excessively decreased. Alternatively, the diameter of the cross section of the introduction channel 22 is set to 1/3 or less of the diameter of the cross section of the inflow channel 23, so that the cross-sectional area of the introduction channel 22 can be inhibited from being excessively increased and the change of the flow rate to the movement amount of the valve body section 10 can be inhibited from being excessively increased.

The embodiment of the present disclosure has been described above. However, the present invention is not limited to the above embodiment, and can be variously changed without departing from a scope of claims. Some of the above configurations of the embodiment may be omitted, or the configurations can be arbitrarily combined differently from the above embodiment.

The invention claimed is:

1. A flow rate regulating device comprising:
a valve body section that moves along an axis extending in a vertical direction in a valve chamber and has a flat valve body surface extending in a horizontal direction;
a valve seat section having a flat valve seat surface provided around a channel opening that communicates with an inner channel and the valve chamber, disposed at a position opposite to the valve body surface and extending in the horizontal direction;
a regulation mechanism that moves the valve body section along the axis to regulate a distance between the valve body surface and the valve seat surface; and
a control unit that controls the regulation mechanism,
wherein the regulation mechanism includes a stepping motor that rotates a drive shaft about the axis, and a moving member that moves along the axis in response to rotation of the drive shaft and is coupled to the valve body section, and
the control unit controls the stepping motor so that the valve body section moves in a movement range in which the valve body surface and the valve seat surface maintain a noncontact state, in accordance with an excitation signal that changes by a micro step unit obtained by dividing a step by a predetermined division number,
wherein the movement range is set so that the channel cross-sectional area of the channel opening substantially matches the change amount of the minimum channel cross-sectional area of the channel formed between the valve body surface and the valve seat surface when the valve body surface is moved from a first position to a second position, the first position being a position where the valve body surface is closest to the valve seat surface and being the furthest point of motion of the valve body section in the movement range, the second position being a position where the valve body surface is farthest from the valve seat surface.

2. The flow rate regulating device according to claim 1, wherein the control unit sets the predetermined division number so that the change of the flow rate per minute due to the movement amount of the valve body surface along the axis at one micro step satisfies 0.01 mL or more and 0.05 mL or less.

3. The flow rate regulating device according to claim 2, wherein
the channel opening is formed in a round shape about the axis in planar view,
the valve body surface is formed in a round shape about the axis in planar view,
the valve seat surface is formed in an annular shape that surrounds the channel opening about the axis in planar view, and
$r2 \geq 3 \cdot r1$ is satisfied in which r1 is a radius of the channel opening, and r2 is a radius of either smaller one of the valve body surface and the valve seat surface.

4. The flow rate regulating device according to claim 2, comprising an inflow channel that guides the fluid to the inner channel and is formed in a round shape in cross-sectional view, wherein the inner channel is formed in a round shape in cross-sectional view, and
a diameter of a cross section of the inner channel is set to 1/10 or more and 1/3 or less of a diameter of a cross section of the inflow channel.

5. The flow rate regulating device according to claim 1, wherein
the channel opening is formed in a round shape about the axis in planar view,
the valve body surface is formed in a round shape about the axis in planar view,
the valve seat surface is formed in an annular shape that surrounds the channel opening about the axis in planar view, and
$r2 \geq 3 \cdot r1$ is satisfied in which r1 is a radius of the channel opening, and r2 is a radius of either smaller one of the valve body surface and the valve seat surface.

6. The flow rate regulating device according to claim 5, comprising an inflow channel that guides the fluid to the inner channel and is formed in a round shape in cross-sectional view, wherein the inner channel is formed in a round shape in cross-sectional view, and
a diameter of a cross section of the inner channel is set to 1/10 or more and 1/3 or less of a diameter of a cross section of the inflow channel.

7. The flow rate regulating device according to claim 1, comprising an inflow channel that guides the fluid to the inner channel and is formed in a round shape in cross-sectional view, wherein the inner channel is formed in a round shape in cross-sectional view, and
a diameter of a cross section of the inner channel is set to 1/10 or more and 1/3 or less of a diameter of a cross section of the inflow channel.

8. The flow rate regulating device according to claim 1, wherein the control unit generates a micro step excitation current that changes in a stepwise manner by the micro step unit to control the stepping motor.

9. A control method of a flow rate regulating device, the flow rate regulating device comprising:
a valve body section that moves along an axis extending in a vertical direction in a valve chamber and has a flat valve body surface extending in a horizontal direction,
a valve seat section having a flat valve seat surface provided around a channel opening that communicates with an inner channel and the valve chamber, disposed at a position opposite to the valve body surface and extending in the horizontal direction, and
a regulation mechanism that moves the valve body section along the axis to regulate a distance between the valve body surface and the valve seat surface, wherein the regulation mechanism includes:
a stepping motor that rotates a drive shaft about the axis, and
a moving member that moves along the axis in response to the rotation of the drive shaft and is coupled to the valve body section, the method comprising:
a control step of controlling the stepping motor, wherein in the control step, the stepping motor is controlled so that the valve body section moves in a range in which the valve body surface and the valve seat surface maintain a non-contact state, in accordance with an excitation signal that changes by a micro step unit obtained by dividing a step by a predetermined division number,
wherein the movement range is set so that the channel cross-sectional area of the channel opening substantially matches the change amount of the minimum channel cross-sectional area of the channel formed between the valve body surface and the valve seat surface when the valve body surface is moved from a first position to a second position, the first position being a position where the valve body surface is closest to the valve seat surface and being the furthest point of motion of the valve body section in the movement range, the second position being a position where the valve body surface is farthest from the valve seat surface.

10. The control method of the flow rate regulating device according to claim 9, wherein in the control step, a micro step excitation current that changes in a stepwise manner by the micro step unit to control the stepping motor is generated.

\* \* \* \* \*